TAPE REELING DEVICE

Filed Nov. 4, 1968

INVENTOR.
WILLIAM A. KRAFT
BY Samuel R. Genca
ATTORNEY 3,517,895
TAPE REELING DEVICE
William A. Kraft, Fairport, N.Y., assignor to The Singer Company, a corporation of New Jersey
Filed Nov. 4, 1968, Ser. No. 772,984
Int. Cl. B65h 59/38, 63/02
U.S. Cl. 242—190 9 Claims

ABSTRACT OF THE DISCLOSURE

A tape reeling device wherein tape is transported between two reels under substantially constant tension within an operating range under control of a buffer arm which is responsive to a mechanical flip-flop means which coacts with a single power switch for switching power to a brake and motor during reeling and unreeling operations.

BACKGROUND—FIELD OF THE INVENTION

The present invention relates to a tape information system and, more particularly, to a high speed tape reeling device.

BACKGROUND—PRIOR ART

With the advent of high speed electronic data processors and high speed electrical data signal generation and transmission, there has been a pressing need for high speed paper tape and magnetic tape handling systems. Although prior art tape handling systems have worked satisfactorily at their intended speeds, attempts to use the prior art systems in high speed punches and readers have resulted in major problems, such as, tape breakage and excessive wear. In high speed tape handling systems, the tape may be suddenly stopped when searching for a desired bit of information on the tape. The sudden stoppage of the tape may result in an unwinding of the tape on the reel or tape breakage. Thus, it may be seen that maintaining proper tension on the tape during high speed transportation of the tape may also be a major problem. Prior art devices for tape reeling devices or apparatus generally utilize at least two separate switches for establishing limits of travel of a buffer arm during reeling and unreeling operations. The buffer arm may, when the tension on the tape is either too high or too low, oscillate in relatively low amplitudes at one of the switches so that that switch may be continuously changing states during small changes in tape tension. As a consequence, a motor in prior art devices may be continuously energized and deenergized at the same rate or frequency of the oscillations. From an operating point of view, it would appear to be better to maintain a relatively steady state of the motor once a given state is selected instead of continuously changing states at some frequency for small changes in tape tension.

SUMMARY OF THE INVENTION

According to this invention, a tape reeling device is useful for unwinding or pulling tape from a reel under a uniform tension. The tape reeling device comprises motor means for unwinding tape off the reel when energized and a solenoid brake means which is normally "on" for stopping the reel unless energized. A circuit means including a normally open switch in one state is included for energizing motor means and brake means when closed or switched to another state. Also included is a buffer means having a spring biased buffer arm which is pivotally mounted for producing a loop of tape when the tape is tensioned or pulled at a point distal to the reel. The arm is responsive to the tension for varying the length of the tape loop by yieldingly pivoting through a given arcuate path. Coacting with the switch and arm is a mechanical flip-flop means positioned in cooperative relationship with the switch for changing the state of the switch when the arm moves between a first portion of the given arcuate path and a second portion of the path, part of which overlaps the first portion such that the switch does not change states when the arm pivots within this overlapping portion. Thus, the motor means and the solenoid means remain either energized or de-energized while the arm remains in the overlapping portion between the first and second portion of the arcuate path. In this way, the tension on the tape within the overlapping portion is tensioned by the arm and a steady state condition on the solenoid brake means and motor means is achieved.

BRIEF DESCRIPTION OF THE FIGURES

The origin and method of operation of the invention may best be understood from the following description when read in connection with the accompanying drawings, in which.

Figures 1, 2, 3, 4, 5, 6:
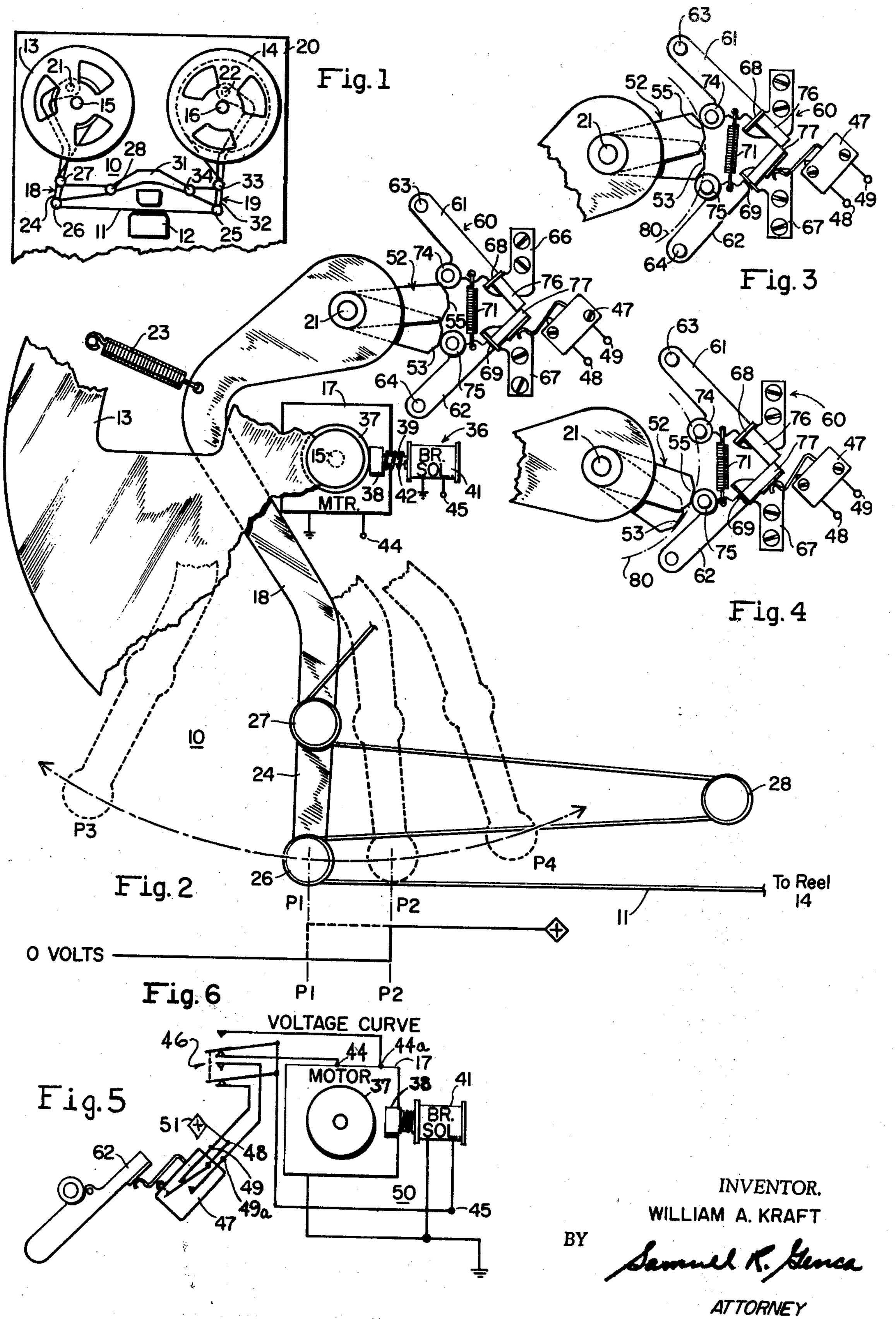
FIG. 1 is a partial front view of a tape information system utilizing a tape reeling device in accordance with the invention.
FIG. 2 is a fragmentary front elevational view of a preferred embodiment of the invention in a tape reeling device.
FIGS. 3 and 4 show a front elevational view of a mechanical flip-flop means utilized in the invention of FIG. 1 showing two operating positions of the mechanical flip-flop means.
FIG. 5 is a schematic view of a circuit used for energizing a motor and brake solenoid used in the tape reeling device of FIGS. 1 and 2.
FIG. 6 is a voltage curve showing energization of the brake solenoid and motor in FIG. 5.

Referring now to the drawings where reference numerals designate like or corresponding elements throughout the several views, there is shown in FIG. 1 a tape information system including a tape reeling device 10 in accordance with a preferred embodiment of the invention. Only the elements necessary for an understanding of the invention are shown. Tape 11 which may be magnetic, plastic, or the like is transported in either direction across a utilization device 12 which may be, for example, a punch, reader, or magnetic pick-up in a path between reels 13 and 14. The reels 13 and 14 may be used either as supply reels or take-up reels for storing the tape 11 thereon. The reels 13 and 14 are mounted on shafts 15 and 16, respectively, which are driven in a clockwise or counterclockwise direction by individual reversable motors 17 (FIG. 2) on each shaft 15 and 16. Uniform tension on tape 11 is maintained in part by buffer arms 18 and 19 which are pivotally mounted on a frame 20 at pivot pins 21 and 22, respectively. The buffer arm 18 is spring biased outwardly by a spring 23 (FIG. 2) coupled between the frame 20 and the buffer arm 18. It should be understood that while a tension spring 23 is shown other springs, such as a Flexator manufactured by Hunter Spring Corp., may be used to derive a uniform torque or spring bias in an outward direction on the arm 18. The buffer arm 19 is spring biased in a similar manner by a spring (not shown). The buffer arms 18 and 19 are biased in an outward direction to effect a tension on the tape 11 across the utilization device 12. The buffer arms 18 and 19 pivot at their free ends 24 and 25, respectively, in arcuate paths. Buffer arm 18 includes guide rollers 26 and 27 which coact with a fix roller 28 for producing a loop of tape 11 therebetween, whose length is a function of the spring constant of the spring 23 and the tension on the tape 11. The roller 28 is fixed to the frame 20 by a bracket 31. The buffer arm 19 includes guide rollers 32 and 33 which coact with the roller 34 in a similar manner to produce another loop of tape 11 thereon under tension. The guide roller 34 is fixed to the frame 20 by the bracket 31.

Referring now to FIGS. 2–6, the tape reeling device 10 is shown in greater detail with buffer arm 18 and reel 13. It should be understood that a similar arrangement is provided for the reel 14 and buffer arm 19. As was previously mentioned, the buffer arm 18 swings in a given arcuate path at the free end 24 between positions P3 and P4 and is responsive to tension on the tape 11 within the arcuate path. The length of tape 11 within the loop on rollers 26 and 27 and 28 is varied as mentioned above by a function of the tension on the tape 11 at a point distal to the reel 13. The free end 24 of the arm 18 and the arm 18 are shown in phantom view in various positions P1, P2, P3, and P4 along the arcuate path. As the tape tension increases, the free end 24 of the arm 18 moves towards the right to position P4 and, conversely, as the tension on the tape 11 decreases, the free end 24 of the arm 18 moves to the left toward P3. It will be shown in accordance with the invention that the buffer arm 18 will normally be disposed between points P1 and P2 within the arcuate path during normal tape reeling operations.

In accordance with the invention, the tape reeling device 10 includes a brake means 36 which includes a brake disc 37 fixed to the shaft 15 and a brake shoe 38 coacting with the brake disc 37. The shoe 38 is connected to an armature 39 which is disposed within a brake solenoid 41. The brake shoe 38 is biased to the brake disc 37 when the brake solenoid 41 is de-energized by a spring 42. The motor 17 and the brake means 36 are electrically connected in parallel at terminals 44 and 45, respectively, in a circuit 50 and in series with a normally closed switch 47 which is connected to the circuit 50 at terminals 48 and 49. The switch 47 is connected in series with a voltage source at 51. It should be understood, of course, that a normally open switch may be used without departing from the invention.

Coacting with the buffer arm 18 is a mechanical flip-flop means 60. The mechanical flip-flop means 60 includes a cam 52 fixed to the buffer arm 18 at the pivot pin 21. The cam 52 comprises two spaced apart lobes 53 and 55. The spacing between the lobes 53 and 55 determines the normal operating range, viz. P1–P2, of the free end 24 of the buffer arm 18 in the arcuate path. More particularly, the separation between the lobes 53 and 55 determine the separation of the points P1 and P2 in a manner to be described hereinafter. The lobes 53 and 55 may be separated and adjusted, if desired. However, as shown in FIG. 2, they are affixed to the shaft 21 and the buffer arm 18 by a predetermined separation distance. The mechanical flip-flop means 60 includes two latching members 61 and 62 which are pivotally mounted at 63 and 64 on the frame 20 and coact with the cam lobes 53 and 55. The latching members 61 and 62 are guided by guide members 66 and 67. Each of the guide members 66 and 67 include transverse guide slots 68 and 69, respectively, for guiding the latching members 61 and 62 so that they freely pivot about the pivots 63 and 64, respectively.

The latching members 61 and 62 are spring biased towards each other by a common spring 71, such that the latching members 61 and 62 remain latched in one of two positions once set. One of the two separate positions is shown in FIGS. 2 and 4. The other position is shown in FIG. 3. The switch 47 is positioned in cooperative relationship with the latching member 62 so that when the latching members are disposed in the position shown in FIGS. 2 and 4, the switch 47 is normally open. However, when the latching members 61 and 62 are disposed in the position shown in FIG. 3, the switch 47 is closed since the latching member 62 is biased away from the switch 47 by the spring 71. The latching member 61 includes a cam follower roller 74 which coacts with lobes 53 and 55 of the cam 52. Latching member 62 also includes a cam follower roller 75 which coacts with the cam lobes 53 and 55 of the cam 52. The cam lobes 53 and 55 are both disposed a given distance from the pivot pin 21 along radii of an imaginary circle 80. Since the latching members 61 and 62 are both pivotally mounted at 63 and 64, respectively, their corresponding rollers 74 and 75 may traverse the circle 80 unless latched away from the circle 80 by the other one of the members 61 and 62. Thus, only one of the latching members 61 and 62 and its corresponding roller lie within the circle 80 at a time so that the cam lobes 53 and 55 may traverse one or the other of the latching members 61 and 62. However, when the cam lobes 53 and 55 coact with a cam roller lying within the circle 80, the other latching member is tripped from its latch position to a new position within the circle 80. This may be seen more clearly in FIGS. 3 and 4.

In FIG. 3 the latching member 62 retains the latching member 61 and its corresponding cam follower roller 74 outside the circle 80 and away from the cam lobes 53 and 55. Thus, the arm 18 may move in its arcuate path at the free end 24 between the point P1 and P4 without an unlatching of the latching member 61. When the free end 24 of the buffer arm 18 moves to the left past point P2, the latching member 61 is tripped to a new position as shown in FIGS. 2 and 4. The member 62 is now latched by the member 61 in a new position such that the cam lobes 53 and 55 may now traverse roller 75 and have no effect on the latching member 62 unless the cam lobes 53 and 55 coact with roller 74 and the latching member *61a*.

FIG. 5 shows the circuit 50. The circuit includes a double throw switch 47 connected to a power source 51 at terminal 48. The switch 47 includes two terminals 49 and *49a* connected to a switch 46 which may be contacts of a relay or a remote controlled switch. The switch 46 may, for example, be connected to a driver (not shown) at the utilization device 12. The switch 46 is a double pole, double throw switch for bidirectional control of the motor 17 and mechanical flip-flop means 60, in a manner to be described hereinafter. The driver may drive the tape 11 bidirectionally acros the utilization device 12. The switch 45 is connected to the switch 47 so that the switch 47 may function as a normally closed or normally open switch, as desired. As shown in FIG. 5, the switch 47 is normally closed. However, by changing the position of the contacts in switch 46, the switch 47 may be normally open. The switches 46 and 47 are connected in series with the motor 17 and the brake solenoid 41. The motor 17 and the brake solenoid 41 are connected in parallel with the power source 51 at terminals 44, *44a*, and 45, respectively, and to ground.

FIG. 6 shows the relationship of the voltage on the motor 17 and the brake solenoid 41 for various positions of the free end 24 of the arm 18 between points P1, P2, P3, and P4. The motor 17 and brake solenoid 41 may have ground or zero volts when the free end 24 of the arm 18 moves between points P3 and P2 or be energized with a positive potential when the free end 24 of the arm 18 moves between points P4 and P1. It should be noted that between points P1 and P2 the motor 17 and the brake solenoid 41 may be either energized or de-energized depending upon whether the free end of the arm 18 moved from point P4 to point P1 or whether it moved from point P3 to point P2. In a way this voltage curve appears to be a hysteresis curve where the energization state of the motor 17 does not change state unless it passes the knee of the voltage curve. Thus, once the motor 17 and the brake solenoid 41 are energized, the free end 24 of the arm 18 may move between points P4 and P1 without changing state or if the motor 17 and the brake solenoid 41 are de-energized, the free end 24 of the arm 18 may move between points P3 and P2 without changing to a different state. This is an advantage since the motor 17 and brake solenoid 41 remains in a given state for a greater amount of travel of the free end 24 of the arm 18.

In the operation of the tape reeling device 10, tape 11 may be transported bidirectionally across the utilization device 12 between reels 13 and 14 by the driver (not shown) at the utilization device 12. During the operation of the tape reeling device 10, the mechanical flip-flop means 60 has two electrical states—a zero "0" state and a one "1" state. In the zero state the switch 47 is electrically open and in the one state the switch 47 is electrically closed.

FIGS. 2 and 4 show the flip-flop means 60 in the zero state and FIG. 3 shows the flip-flop means in the one state when the switch 46 is disposed in the position shown in FIG. 5. However, if switch 46 is switched from the position shown in FIG. 5, the flip-flop means 60 in FIGS. 2 and 4 are changed to the one state and the mechanical flip-flop means 60 in FIG. 3 will be changed to the zero state. The position of the switch 46 is directly related to the direction of tape travel and is disposed in the position shown in FIG. 5 from reel 13 to reel 14 and is switched when tape travels from reel 14 to reel 13.

As was previously stated, the buffer arm 18 may pivot between points P3, P1, P2, and P4 as a function of tape tension. In the absence of tension on the tape 11 at the utilization device 12, the buffer arm 18 is normally biased in the position P3 by the spring 23. When the buffer arm 18 is in position P3, the mechanical flip-flop means 60 is disposed in a zero state and the switch 47 is electrically open (FIGS. 2 and 4). When the switch 47 is open, the circuit 50 is also open so that the brake solenoid 41 and the motor 17 are de-energized. When the mechanical flip-flop means 60 is in a zero state, the member 62 is latched by the member 61 so that the roller 75 lies outside the circle 80 (FIG. 4). When the roller 75 it outside of the circle 80, the cam lobes 53 and 55 of the cam 52 may traverse the roller 75 without changing the position of the member 61 and the state of the mechanical flip-flop means 60. When the mechanical flip-flop means 60 is in the zero state, the free end 24 of the buffer arm 18 may move between positions P3 and P2 without changing the state of the mechanical flip-flop means 60. Also, the spring 42 urges the brake shoe 38 against the disc 37, thus preventing a rotation of the shaft 15 and reel 13. However, if tension on the tape 11 is increased such that the free end 24 of the buffer arm 18 moves past the position P2, the mechanical flip-flop means 60 changes state. That is, cam lobe 55 coacts with the roller 74 to pivot the latching member 61 in a counterclockwise direction releasing the latching member 62. When the latching member 62 is released, the spring 71 urges the latching member 62 in a counterclockwise direction to electrically close the switch 47. When the switch 47 is electrically closed, the mechanical flip-flop means 60 is now in a one state and the circuit 50 is closed. When the circuit 50 is closed, the motor 17 and brake solenoid 41 are energized so that the disc 37 and reel 13 are free to rotate in a manner to unwind tape 11 from the reel. Tape tension is thus decreased when tape 11 is unreeled or unwound from the reel 13. The free end 24 of the buffer arm 18 in response to a decrease of tape tension may move between points P4 and P1 without changing the state of the mechanical flip-flop means 60 and the switch 47. If the free end 24 of the buffer arm 18 moves beyond point P1, the cam lobe 53 coacts with the roller 75 to pivot the member 62 in a clockwise direction to release the member 61. When the member 61 is released, it latches the member 62 such that the roller 75 is outside the circle 80. Also, the switch 47 is changed to the electrically open position and the mechanical flip-flop means 60 is changed to a zero state. When the switch 47 is electrically open, the brake solenoid 41 is de-energized and the spring 42 urges the brake shoe 38 against the disc 37, thus braking the shaft 15 and the reel 13. Normally, the buffer arm 18 moves between points P1 and P2 during reeling operations. In any event, the state of the mechanical flip-flop means 60 does not change within overlapping portions between P1 and P2 defined within the arcuate paths P1, P4 and P3 and P2.

The tape reeling device 10 described herein has been specifically illustrated and described in a single embodiment for the purpose of disclosing a presently preferred form of the invention. It is intended that the particular illustrative embodiment shall not be limiting on the claims beyond the clear meaning of the language employed therein.

What is claimed is:

1. A tape reeling device comprising:
(a) a frame;
(b) motor means for rotating a reel in a direction to unwind tape thereon when energized;
(c) solenoid brake means for normally stopping said reel except when energized;
(d) circuit means including a switch normally in one state for energizing said motor means and said brake means when switched to another state;
(e) buffer means including a spring biased buffer arm pivotally mounted on said frame for producing a loop of said tape when said tape is tensioned at a point distal to said reel;
(f) said arm being responsive to said tension for varying the length of said tape loop by yieldingly swinging through a given arcuate path; and
g) means positioned in cooperative relationship with said switch and said arm for changing the state of said switch when said arm pivots between a first portion of said given arcuate path and a second portion, part of which overlaps said first portion so that said switch does not change states when said arm pivots within the overlapping portion of said arcuate path.

2. The invention defined in claim 1 wherein said last-named means includes a mechanical flip-flop means which changes states at two separate threshold levels of movement of said arm in said path such that said switch remains in the last selected state between said thresholds.

3. The invention defined in claim 1 wherein said last-named means includes first and second latching members which coact to latch each other depending upon the position of said arm in said path so that said switch remains in one of said states until said first and second latching members change latching positions.

4. The invention defined in claim 1 wherein said motor means is reversable to wind tape on said reel.

5. A tape reeling device comprising:
(a) a frame;
(b) reel mounting means on said frame including a shaft for driving a reel;
(c) motor means connected to said shaft for at least unwinding tape off said reel when energized;
(d) solenoid brake means for normally stopping said reel except when energized;
(e) circuit means including a switch normally in one state for energizing said motor means and said brake means when switched to another state;
(f) buffer means including a spring biased buffer arm pivotally mounted on said frame for producing a loop of said tape when said tape is tensioned at a point distal to said reel;
(g) said arm being responsive to said tension for varying the length of said tape loop by yielding swinging through a given arcuate path; and
(h) means positioned in cooperative relationship with said switch and said arm for changing the state of said switch when said arm pivots between a first portion of said given arcuate path and a second portion, part of which overlaps said first portion so that said switch does not change states when said arm pivots within the overlapping portion of said arcuate path.

6. The invention defined in claim 5 wherein said last-named means is a mechanical flip-flop means.

7. A tape reeling device comprising:
(a) a frame;
(b) a reel rotatably mounted on said frame;
(c) guide means including a spring biased buffer arm for guiding said tape from said reel to a utilization device in a given direction under a variable tension thereat,
   (i) said buffer arm being pivotally mounted on said frame and responsive to said tension for pivoting at one end over a given arcuate path;
(d) motor means coupled to said reel for driving said reel to decrease tension on said tape when energized;
(e) braking means coupled to said reel for stopping said reel when said motor is de-energized to increase said tension in response to stoppage of said reel; and
(f) mechanical flip-flop means coupled to said arm and being responsive to the position of said arm over a first portion of said path in one state for energizing said motor means and being responsive to said arm over a second portion of said path in another state for de-energizing said motor means,
   (i) said first and second portions of said path being overlapping so that said mechanical flip-flop means remains in the last state selected within said overlapping portion.

8. The invention defined in claim 7 wherein said mechanical flip-flop means includes a switch connected to a source of power.

9. The invention defined in claim 7 wherein said mechanical flip-flop means further includes means for reversing said motor and said states of said mechanical flip-flop means.

References Cited

UNITED STATES PATENTS

| | | | |
|---|---|---|---|
| 3,189,291 | 6/1965 | Welsh | 242—190 |
| 3,269,670 | 8/1966 | Brian et al. | 242—190 |
| 3,347,481 | 10/1967 | Epstein et al. | 242—190 |
| 3,405,857 | 10/1968 | Albrecht | 226—195 |

LEONARD D. CHRISTIAN, Primary Examiner

U.S. Cl. X.R.

226—195